US009616373B2

United States Patent
Kinsey, Jr. et al.

(10) Patent No.: US 9,616,373 B2
(45) Date of Patent: Apr. 11, 2017

(54) INERTIAL SEPARATION PRE-CLEANER

(71) Applicant: Caterpillar Inc., Peoria, IL (US)

(72) Inventors: Bobby J. Kinsey, Jr., Washington, IL (US); Wei Yan, Mossville, IL (US)

(73) Assignee: Caterpillar Inc., Peoria, IL (US)

( * ) Notice: Subject to any disclaimer, the term of this patent is extended or adjusted under 35 U.S.C. 154(b) by 221 days.

(21) Appl. No.: 14/523,365

(22) Filed: Oct. 24, 2014

(65) Prior Publication Data

US 2016/0115916 A1    Apr. 28, 2016

(51) Int. Cl.
| | | |
|---|---|---|
| B01D 50/00 | (2006.01) | |
| B01D 46/24 | (2006.01) | |
| B01D 45/04 | (2006.01) | |
| B01D 46/00 | (2006.01) | |
| B01D 45/08 | (2006.01) | |
| F02M 35/02 | (2006.01) | |
| F02M 35/08 | (2006.01) | |

(52) U.S. Cl.
CPC ........... *B01D 50/002* (2013.01); *B01D 45/04* (2013.01); *B01D 45/08* (2013.01); *B01D 46/0041* (2013.01); *B01D 46/24* (2013.01); *B01D 46/2403* (2013.01); *F02M 35/0216* (2013.01); *F02M 35/086* (2013.01); *B01D 2279/60* (2013.01)

(58) Field of Classification Search
CPC ........ B01D 45/04; B01D 45/08; B01D 45/16; B01D 50/002; B01D 46/0041; B01D 46/24; B01D 46/2403; B01D 2279/60; F02M 35/0216; F02M 35/086
See application file for complete search history.

(56) References Cited

U.S. PATENT DOCUMENTS

| | | | | |
|---|---|---|---|---|
| 739,596 | A | * | 9/1903 | Friesland ............... B01D 45/08 55/465 |
| 1,048,533 | A | * | 12/1912 | Hoffman, Jr. .......... B01D 45/08 55/442 |
| 4,162,905 | A | | 7/1979 | Schuler |
| 4,297,116 | A | * | 10/1981 | Cusick ................. B01D 46/002 55/319 |
| 4,509,962 | A | | 4/1985 | Brietman et al. |
| 4,860,534 | A | | 8/1989 | Easley et al. |
| 7,296,395 | B1 | | 11/2007 | Hartman et al. |
| 7,678,165 | B2 | | 3/2010 | Tingle et al. |

(Continued)

*Primary Examiner* — Robert Clemente
(74) *Attorney, Agent, or Firm* — Leydig, Voit & Mayer, Ltd

(57) ABSTRACT

An inertial separator includes an inlet portion connected to a Y-junction having a first conduit fluidly extending therefrom and a second conduit fluidly extending therefrom. A separator wall is disposed between and along at least a portion of the first and second conduits. The separator wall has a tip extending into the Y-junction between an inlet to the first conduit and an inlet to the second conduit. An angle is formed between a major longitudinal dimension of the separator wall and the inlet portion centerline, and a ramp is formed adjacent the second end of the generally straight inlet portion, upstream of the Y-junction in a direction of airflow from the inlet opening towards the first and second outlets. During operation, debris entering the inlet portion is separated from an airflow and exits the through the second conduit while air exits through the first conduit.

11 Claims, 6 Drawing Sheets

(56) References Cited

U.S. PATENT DOCUMENTS

| | | | |
|---|---|---|---|
| 2003/0217534 A1* | 11/2003 | Krisko | B01D 45/12 55/337 |
| 2004/0040271 A1* | 3/2004 | Kopec | B01D 46/0004 55/357 |
| 2007/0289265 A1* | 12/2007 | Coulonvaux | B01D 46/0023 55/324 |
| 2009/0139398 A1 | 6/2009 | Sheoran et al. | |
| 2009/0308346 A1* | 12/2009 | Vandike | F02M 35/02 123/198 E |
| 2010/0006361 A1* | 1/2010 | Vandike | F02M 35/164 180/68.1 |
| 2014/0250625 A1* | 9/2014 | Huang | B01D 45/00 15/353 |

* cited by examiner

INERTIAL SEPARATION PRE-CLEANER

TECHNICAL FIELD

This patent disclosure relates generally to material separators and, more particularly, to air cleaners for use on engines.

BACKGROUND

Internal combustion engines are supplied with a mixture of air and fuel for combustion within the engine that generates mechanical power. To maximize the power generated by this combustion process, the engine is often equipped with a turbocharged air induction system.

To prevent possible contamination and damage of internal engine components by debris ingested from the environment such as dust and other debris, engines typically use filters to separate dust and other debris from incoming engine air. For large displacement engines, and for engine applications on vehicles operating in harsh environments, pre-separators may also be used, upstream of an air filter, to remove larger debris particles from the air so as to prolong the service life of the filter and increase the maintenance interval of the machine in which the engine is installed.

Previously proposed pre-separators are typically of a centrifugal type. In such devices, incoming air is passed through spiral features or tubes within a generally cylindrical shaped housing such that particles suspended or carried into the housing with the incoming air are subjected to a centrifugal force and are thus forced to separate from the air. Particles thus separated are typically collected at the bottom of the housing and removed. Although centrifugal-type pre-separators are at least partially effective in removing larger debris particles from incoming air, they are not suitable for all types of operating environments. For example, machines operating in landfills, forests and other areas where large debris may be present such as leaves, twigs, paper shreds, cloth fibers and the like are present may be prone to having their pre-separators clogged with large debris. Pre-separator clogging, even when not severe, may increase the incoming air pressure drop of the engine, which can decrease the pumping efficiency and increase engine fuel consumption. Additionally, a severe clogging condition may render the engine inoperable and require service. Centrifugal-type pre-separators are especially prone to clogging from debris that is larger than the diameter of the air-swirling pipes used to generate the centrifugal force.

SUMMARY

In one aspect, the disclosure describes an inertial separator for use with an air cleaner of an engine. The inertial separator includes a generally straight inlet portion having an inlet opening at one end and an inlet portion centerline. A Y-junction is fluidly connected at a second end of the generally straight inlet portion, a first conduit is fluidly connected to the generally straight inlet portion at the Y-junction and has a first outlet, and a second conduit is fluidly connected to the generally straight inlet portion at the Y-junction and has a second outlet. A separator wall is disposed between and along at least a portion of the first and second conduits. The separator wall has a tip extending into the Y-junction between an inlet to the first conduit and an inlet to the second conduit. An angle is formed between a major longitudinal dimension of the separator wall and the inlet portion centerline, and a ramp is formed adjacent the second end of the generally straight inlet portion, upstream of the Y-junction in a direction of airflow from the inlet opening towards the first and second outlets.

In another aspect, the disclosure describes an air cleaner for an internal combustion engine. The air cleaner includes a housing forming a first chamber and a second chamber, which are physically separate. An air filter is disposed within the first chamber, and an outlet pipe extends through the housing and is associated with the air filter such that air from the first chamber enters the outlet pipe through the air filter. An inertial separator has an inlet, a first outlet, and a second outlet. The inlet is configured to draw air into the inlet separator. The first outlet is disposed in fluid communication with the first chamber, and the second outlet is disposed in fluid communication with the second chamber. During operation, debris that may enter the air cleaner entrained in an air flow through the inlet may separate from the air flow such that at least a portion of the debris is collect in the second chamber and the air flow passes into the first chamber.

In yet another aspect, the disclosure describes an engine having an air inlet conduit fluidly connected to an intake collector and an exhaust pipe fluidly connected to an exhaust collector. The engine further includes an air cleaner having a housing forming a first chamber and a second chamber, an air filter disposed within the first chamber, and an outlet pipe extending through the housing and associated with the air filter such that air from the first chamber enters the outlet pipe through the air filter. The outlet pipe is fluidly connected to the inlet conduit of the engine. An inertial separator has an inlet, a first outlet, and a second outlet. The inlet is configured to draw air into the inlet separator. The first outlet is disposed in fluid communication with the first chamber, and the second outlet is disposed in fluid communication with the second chamber. During operation, debris that may enter the air cleaner entrained in an air flow through the inlet may separate from the air flow and collect in the second chamber, while the air flow passes into the first chamber. A venturi device is associated with the exhaust pipe and operates to draw air and/or debris from a scavenge air conduit fluidly connected to the second chamber.

DETAILED DESCRIPTION

Figure 1:
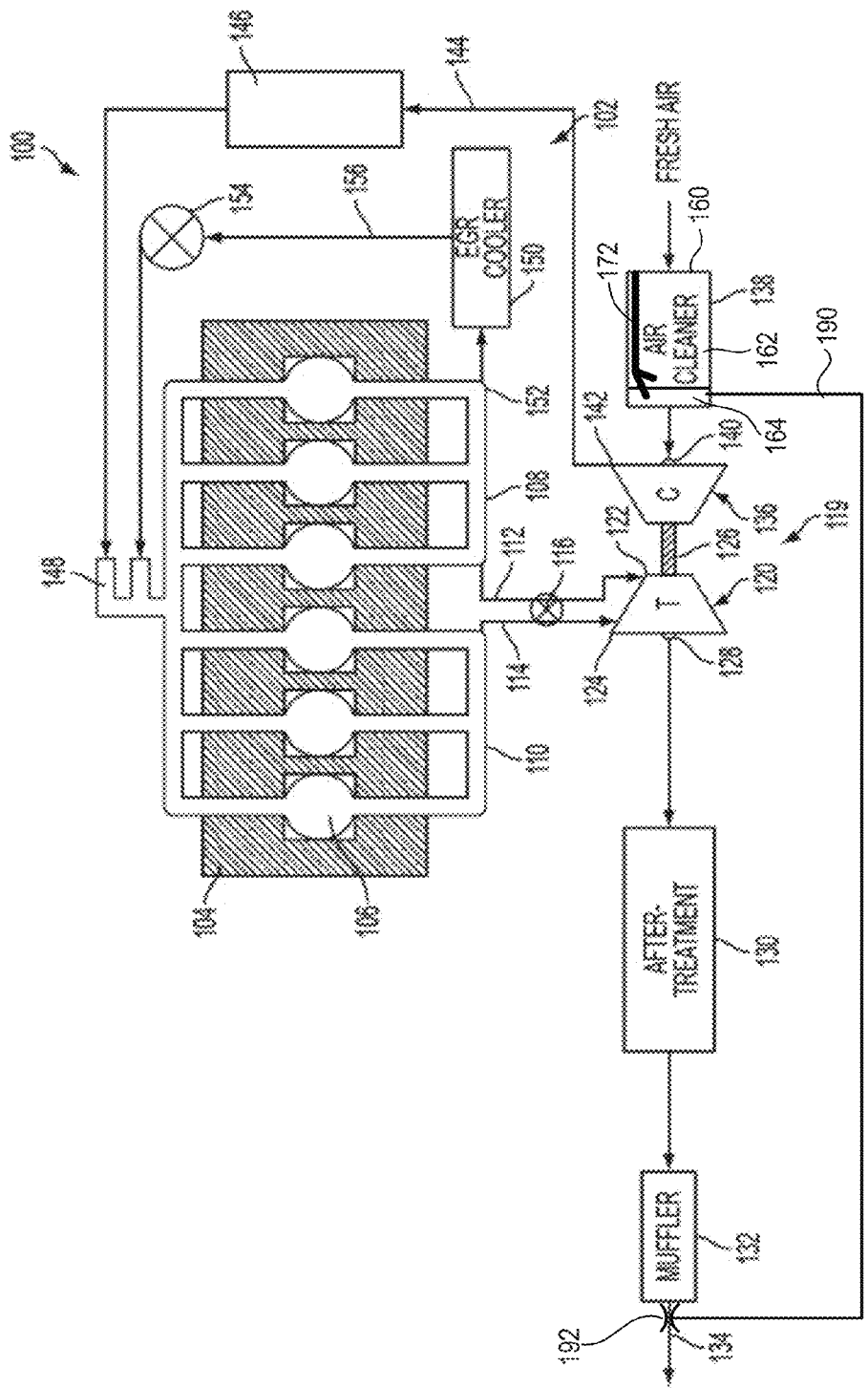
FIG. 1 is an exemplary block diagram of an internal combustion engine in accordance with the disclosure.

This disclosure relates to air cleaners and, more specifically, to air cleaners used in conjunction with various combustion engines including internal combustion engines. The described air cleaner uses inertial separation to remove debris from an air stream provided to an air filter and, ultimately, to an engine. By removing material from air stream upstream of the air filter, the service usefulness of the filter can be extended and its function improved, thus reducing service time and cost for the engine and increasing fuel efficiency of the engine. A simplified block diagram of an engine 100 having a high pressure EGR system 102 is shown in FIG. 1 as an exemplary embodiment for an engine, but it should be appreciated that other engine types and configurations can be used. The engine 100 includes a cylinder case 104 that houses a plurality of combustion cylinders 106. In the illustrated embodiment, six combustion cylinders are shown in an inline or "I" configuration, but any other number of cylinders arranged in a different configuration, such as a "V" configuration, may be used. The plurality of cylinders 106 is fluidly connected via exhaust valves (not shown) to first and second exhaust conduits 108 and 110. Each of the first and second exhaust conduits 108 and 110 is connected to a respective exhaust pipe 112 and 114, which are in turn connected to a turbine 120 of a turbocharger 119. A balance valve 116 is fluidly interconnected between the two exhaust pipes 112 and 114 and is arranged to route exhaust gas from the first exhaust pipe 112 to the second exhaust pipe 114, as necessary, during operation. It is noted that the balance valve 116 is optional and may be omitted.

In the illustrated embodiment, the turbine 120 has a separated housing, which includes a first inlet 122 fluidly connected to the first exhaust pipe 112, and a second inlet 124 connected to the second exhaust pipe 114. Each inlet 122 and 124 is disposed to receive exhaust gas from one or both of the first and second exhaust conduits 108 and 110 during engine operation. The exhaust gas causes a turbine wheel (not shown here) connected to a shaft 126 to rotate before exiting the housing of the turbine 120 through an outlet 128. The exhaust gas at the outlet 128 is optionally passed through other exhaust components, such as an aftertreatment device 130 that may mechanically and/or chemically remove combustion byproducts from the exhaust gas stream, and/or a muffler 132 that dampens engine noise, before being expelled to the environment through a stack, tail or exhaust pipe 134.

The EGR system 102 includes an optional EGR cooler 150 that is fluidly connected to an EGR gas supply port 152 of the first exhaust conduit 108. A flow of exhaust gas from the first exhaust conduit 108 can pass through the EGR cooler 150 where it is cooled before being supplied to an EGR valve 154 via an EGR conduit 156. The EGR valve 154 may be electronically controlled and configured to meter or control the flow rate of the gas passing through the EGR conduit 156. An outlet of the EGR valve 154 is fluidly connected to the intake manifold 148 such that exhaust gas from the EGR conduit 156 may mix with compressed air from the charge air cooler 146 within the intake manifold 148 of the engine 100.

Rotation of the shaft 126 causes the wheel (not shown here) of a compressor 136 to rotate. As shown, the compressor 136 is a radial compressor configured to receive a flow of fresh, filtered air from an air cleaner 138 through a compressor inlet 140. Pressurized air at an outlet 142 of the compressor 136 is routed via a charge air conduit 144 to a charge air cooler 146 before being provided to an intake manifold 148 of the engine 100. In the illustrated embodiment, air from the intake manifold 148 is routed to the individual cylinders 106 where it is mixed with fuel and combusted to produce engine power.

In the illustrated embodiment, the engine 100 includes an air cleaner 138 disposed to receive fresh air, filter or otherwise remove debris such as dust and other material that may be carried with the fresh air, and provide filtered air to the compressor 136. The air cleaner in the illustrated embodiment includes a housing 160 forming at least two chambers, a first chamber 162 and a second chamber 164, as is also shown in the fragmentary view of the air cleaner 138 in FIG. 2. In reference to FIGS. 1 and 2, the air cleaner 138 includes a filter element 166 disposed within the first chamber 162 and configured to filter air pulled into and passing through the first chamber 162 and into an outlet pipe 168. Air enters or is pulled by the engine into the housing 160 via an inlet opening 170 that is formed in an inertial separator 172.

Figure 2:
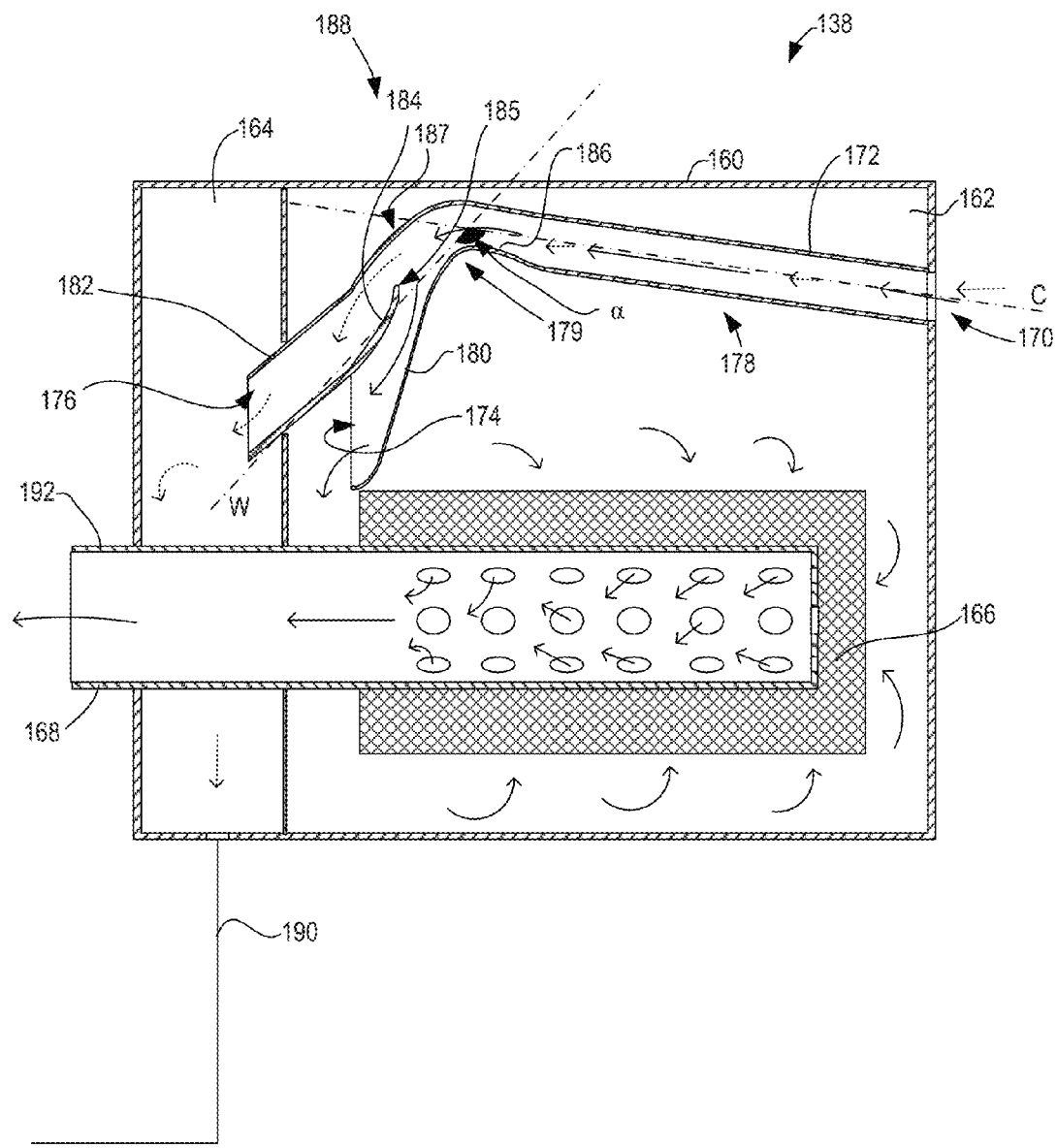
FIG. 2 is a fragmented view of an air cleaner in accordance with the disclosure.

The inertial separator 172 forms the air inlet 170 and two outlets, a first or main outlet 174 and a second or secondary outlet 176. As shown in FIG. 2, a majority of the inertial separator 172 is disposed within the housing 160 and spans across both the first and second chambers 162 and 164, respectively. The main outlet 174 is open to the first chamber 162 and the secondary outlet 176 is open to the second chamber 164. An incoming air stream, which is denoted by solid arrows in FIG. 2, enters the inertial separator via the inlet opening 170 and travels through a generally straight, inlet section 178. The inlet section 178 in the illustrated embodiment is shown as a generally straight pipe segment. The incoming air stream may further include debris entrained therein, which in the illustrated embodiment in FIG. 2 is denoted by dashed-line arrows. The inlet section 178 terminates at a Y-junction 179, from which fluid conduits connect the inlet section 178 to the main and secondary outlets 174 and 176. A main conduit 180 connects the inlet section 178 with the main outlet 174, and a secondary conduit 182 connects the inlet section 178 with the secondary outlet 176.

A separator wall 184 is disposed adjacent and downstream from the Y-junction 179, and forms a common wall between the main and secondary conduits 180 and 182, upstream from the main and secondary outlets 174 and 176. A tip 185 of the separator wall extends within the fluid conduit. The tip 185 has a slight curl towards the second conduit 182, which has been found to reduce a vortex swirl on the downstream side of the tip 185. Such swirl has been determined to create flow circulation that may carry particles, which would otherwise have been separated through the secondary outlet 176, back into the main flow exiting through the main outlet 174, thus reducing the separation efficiency of the device. A slight diameter increase in a bend 187 immediately following the tip 185 also operates to reduce flow velocity and increase pressure drop to trap particles within the secondary conduit 182. Any such pressure drop increase, however, does not affect the overall pressure drop in the main conduit 180 and aids in removing the particles, which are pulled through the device via a scavenge air flow passing through a conduit 190 connected to the second chamber 164, as will be described in the sections that follow.

During operation, the incoming air stream and debris entering through the inlet 170 travels along the inlet section 178. Because the inlet section is generally straight over a sufficient length, for example, at least a length that is equal to about three diameters of the inlet section 178 pipe, the air flow passing therethrough straightens to assume a laminar-like flow profile at least along a portion of the pipe cross section that surrounding the centerline of the inlet section 178. In the illustrated embodiment, the inlet section 178 is at least equal to or longer than three-diameters.

Figure 3:
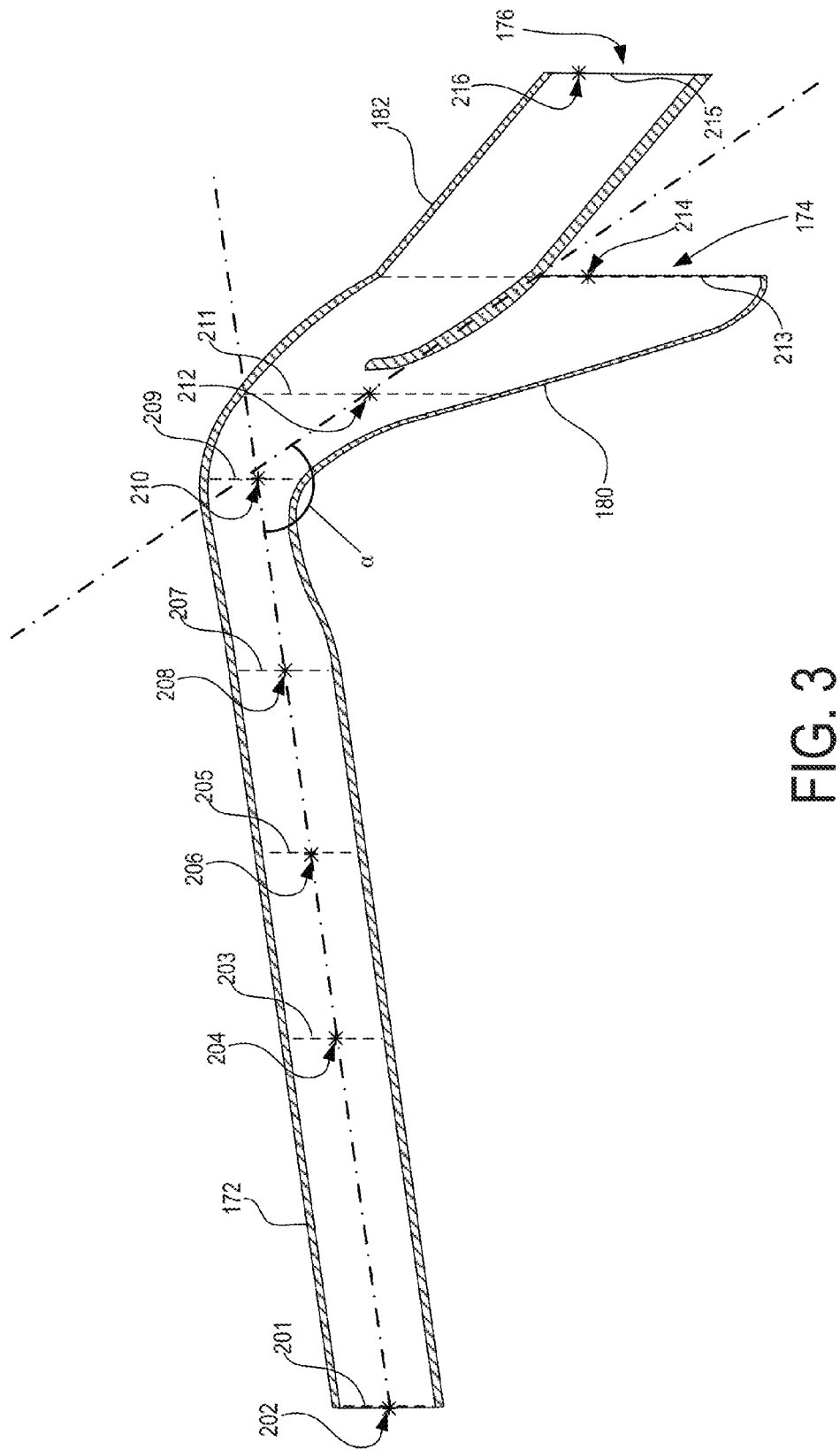
FIG. 3 is a fragmented view of an inertial separation pre-cleaner in accordance with the disclosure.

At the end of the inlet section 178, a ramp 186, which is embodied as a reduced pipe diameter section of the inlet section 178 that extends into the pipe interior on one diametrical side thereof but not the opposite diametrical side, reduces the flow cross section of the pipe to accelerate the air flow. The ramp 186 is disposed on the inside of a turn 188 along an angle, α, formed between the inlet section 178 centerline, C, and a major longitudinal dimension, W, of the separator wall 184, as is more particularly shown in FIG. 2, and also in FIG. 3.

When the air and entrained debris are accelerated by the ramp 186 at the end of the inlet section 178, the increased velocity imparts an increased momentum to the air and especially the debris, which has a higher mass and density than the surrounding air. As the air and debris encounter the turn 188, the increased momentum and inertia of the debris causes a majority of the debris to pass into the secondary conduit 182, while a majority of the air is forced through the main conduit 180 because of the relative cross sectional flow areas presented by each. Debris, which is denoted by dashed lines in FIG. 2, exits the separator 172, is collected in the second chamber 164 of the housing 160, and is otherwise prevented from reaching the filter 166, for example, by placing the filter 166 in the first chamber 162.

To aid the transition of debris into the second chamber 164, which may be formed separately and/or removed from the housing 160, a negative pressure may be applied to the second chamber 164 via suction, which can also serve to remove debris from the second chamber to avoid accumulation. In the illustrated embodiment, and in reference to FIG. 1, suction from the second chamber 164 is accomplished through a scavenge air or suction line 190 that is fluidly connected to the second chamber 164. To create a suction at the line 190, a venturi device 192 is disposed along the exhaust pipe 134 of the engine such that the moving exhaust gas through the exhaust pipe and venturi 192 can create the negative pressure. Additionally, any debris that is pulled from the second chamber 164 of the air cleaner 138 can be passed into, and disposed through, the exhaust pipe 134. Any debris that is not removed from the incoming air stream through the secondary outlet 176 and passes through the main outlet 174 into the first chamber 162, is removed from the air flow provided to the engine by the filter 166. By removing a portion of the debris before it reaches the filter, the service life of the filter 166 can be increased and, additionally, the pressure drop of air through the filter can be reduced over the life of filter, which advantageously improves the pumping efficiency and, thus, the fuel economy of the engine.

In reference now to FIGS. 3-7, an exemplary embodiment of the inertial separator 172 is shown. It should be appreciated, however, that the particular implementation of an inertial separator will depend on various factors including the expected air flow of the engine, the type of debris that may be encountered, the accepted pressure drop through the separator, the size of the engine filter, the operating environment of the engine in terms of presence of ice, wildlife and other factors that may tend to accumulate of block the air passage, and others.

The fragmentary view of the inertial separator 172 denotes eight cross sections along the length of the separator 172, each of which is discussed below to define the structure of the separator 172. Accordingly, in the discussion that follows reference will be made to a first cross section 201 having a first center-point 202, a second cross section 203 having a second centerpoint 204, a third cross section 205 having a third center point 206, a fourth cross section 207 having a fourth centerpoint 208, a fifth cross section 209 having a fifth center point 210, a sixth cross section 211 having a sixth centerpoint 212, a seventh cross section 213 having a seventh centerpoint 214, and an eighth cross section 215 having an eighth centerpoint 216. Setting the first centerpoint 202 as the origin along three orthogonal dimensions, X, Y and Z, the coordinates of the remaining center points are presented in Table 1 below:

TABLE 1

| Centerpoint Name | Reference Numeral (FIG. 3) | X coordinate (mm) | Y coordinate (mm) | Z coordinate (mm) |
| --- | --- | --- | --- | --- |
| First | 202 | 0.0 | 0.0 | 0.0 |
| Second | 204 | 150.0 | 21.0 | 0.0 |
| Third | 206 | 225.0 | 31.5 | 0.0 |
| Fourth | 208 | 300.0 | 42.1 | 0.0 |
| Fifth | 210 | 378.0 | 53.0 | 0.0 |
| Sixth | 212 | 412.4 | −7.0 | 0.0 |
| Seventh | 214 | 460.5 | −74.13 | 0.0 |
| Eighth | 216 | 543.0 | −74.13 | 0.0 |

Figure 7:
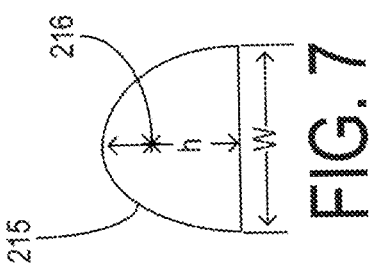
FIGS. 4-7 are representations of various air conduit cross sectional shapes in accordance with the disclosure.
Figure 6:
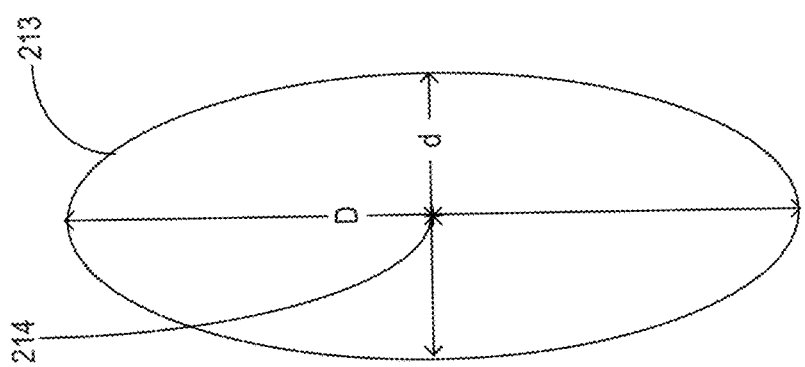
Figure 5:
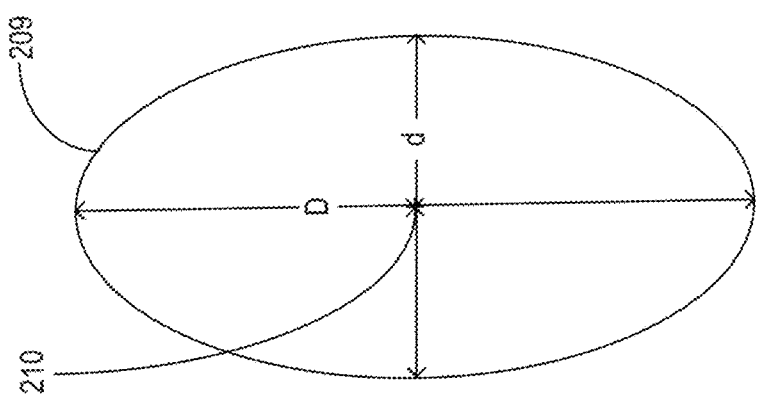
Figure 4:
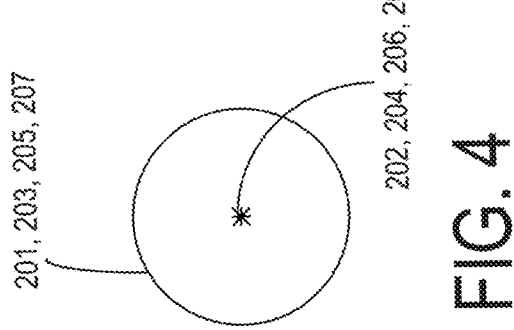

In reference to the various cross sections discussed above, each of the first, second, third and fourth and fifth cross sections 201, 203, 205, 207 and 209 has a circular shape as shown in FIG. 4. The diameter each of these cross sections is about 45 mm except the fifth cross section, which has a diameter of about 30 mm. Each of the sixth and seventh cross sections 211 and 213 has an elliptical cross section. The sixth cross section 211 is shown in FIG. 5, has a major diameter, D, of 110 mm and a minor diameter, d, of 58 mm. The seventh cross section 213, which spans across both the main and secondary conduits 180 and 182, is shown in FIG. 6, has a major diameter, D, of 160 mm and a minor diameter, d, of 60 mm. The eighth cross section 215 has a non-circular shape that is formed by a truncated ellipse. The shape of the eighth cross section 215 is shown in FIG. 7. The eighth cross section 215 has a width, w, of about 52.4 mm and a height, h, of about 50 mm. The angle, α (FIG. 3), in the embodiment illustrated is about 109.8 degrees, but can vary between 100 and 120 degrees.

INDUSTRIAL APPLICABILITY

The present disclosure is applicable to air cleaners and, more specifically, inertial separators for removing debris from an air stream such as an engine air intake. The results of a computational analysis performed to determine the effectiveness of the separator discussed above is shown in FIGS. 8 and 9. In the plots shown in FIGS. 8 and 9, geometry resembling the inertial separator previously discussed is shown during operation. Differently colored traces are used to trace the trajectory of differently sized particles that are introduced into an air flow passing through the separator fluid conduits. As shown, the range of particle sizes is between 1.8e-04 and 5.00e-05 m in FIG. 8, and between 5.00e-05 and 1.00e-06 m in FIG. 9. The boundary conditions for performing the simulation are shown in Table 2 below.

TABLE 2

| Parameter | Value/Input | Comments |
| --- | --- | --- |
| Air Flow Rate | 10.8 m$^3$/min | =0.18 m$^3$/sec = 0.2146 kg/sec |
| Density | 1.192 kg/m$^3$ | Air is assumed incompressible |
| Temperature | 23° C. | |
| Inlet pressure | 101.325 kPa | |
| Particle concentration | 1 g/m$^3$ | Particle (dust) concentration is equivalent to 0.00018 kg/s, at a density of about 1200 kg/m3 |

TABLE 2-continued

| Parameter | Value/Input | Comments |
|---|---|---|
| Particle Distribution | Rosin-Rammeler equation | Particle size distribution fits ISO 12103-1 Arizona Test Dust |
| Air filter pressure drop | 1.2 kPa @10.8 m3/min | |

In addition to the inputs or values shown in Table 2, the simulation was configured to follow a power law at lower flow rates. Various other assumptions used to configure the fluid model include an assumption that the air flow is incompressible at the speed considered, which is at about Mach 0.2, heat transfer was neglected, 90% of the flow was set to exit through the main outlet of the device, the remaining 10% of the flow was assumed to exit the secondary outlet of the device, the dust injection velocity was to be about 75 m/s, which matches the air velocity passing through the device inlet, and that particles would be reflected after hitting a wall of the device.

Figure 8:
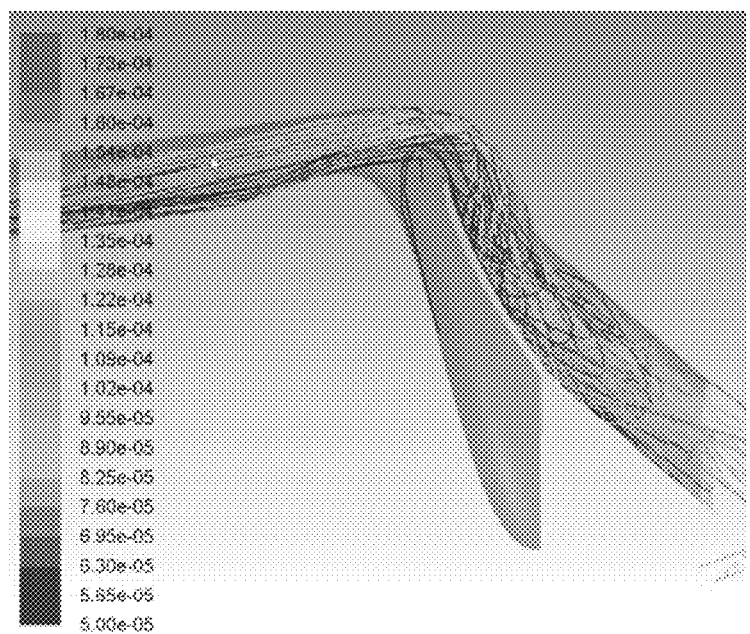
FIGS. 8 and 9 are flow plots illustrating operating conditions of an inertial separation pre-cleaner in accordance with the disclosure.
Figure 9:
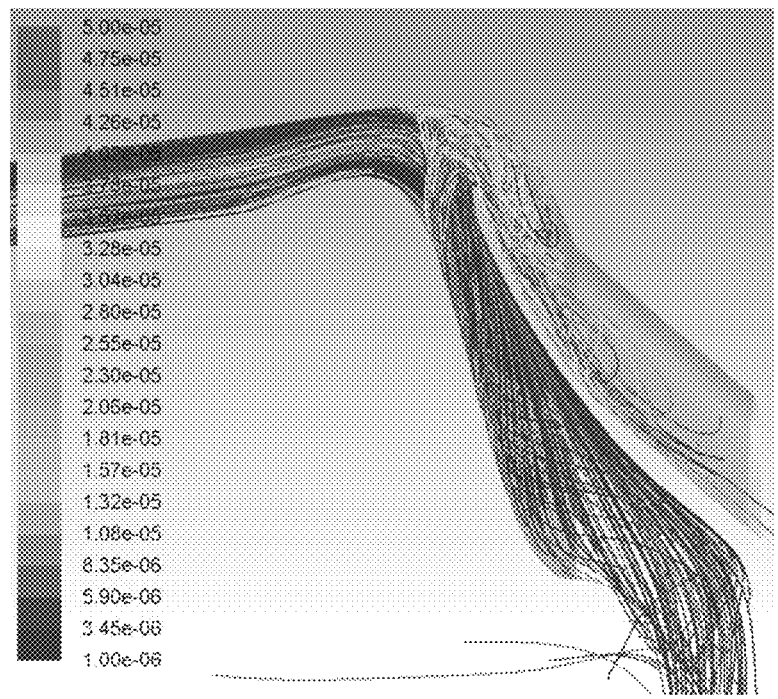
Figure 10:
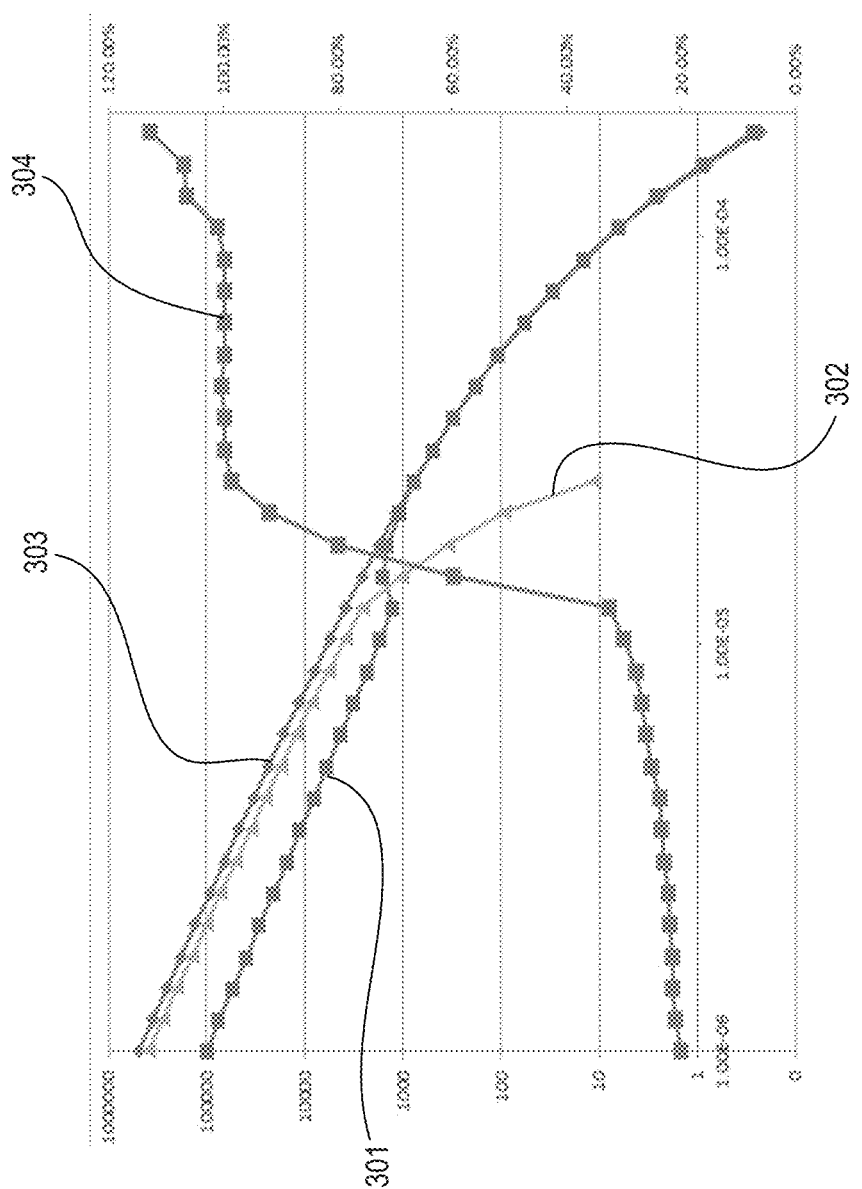
FIG. 10 is a graph showing particle tracking results for an inertial separation pre-cleaner in accordance with the disclosure.

As can be seen from the plots in FIGS. 8 and 9, which represent the results of the simulation, the model predicted that the separation efficiency of particles smaller than 1.00e-5 m is less than 19.92% (1.00e-6 m) to 30.08% (1.00e-5 m). The separation efficiency of particles larger than 1.00e-5 m ranges from 30.08% (1.00e-5 m) to about 91.95% (2.10e-5 m). Larger particles, i.e., particles sized from 2.10e-5 m to 1.80e-04 m, are predicted to have the highest separation efficiency, which ranges from 91.95% (2.10e-5 m) to 100% (1.80e-4 m). These results are plotted in the graph shown in FIG. 10, where particle diameter is plotted against the horizontal axis and particle frequency or concentration is plotted against the vertical axis. As can be seen from this graph, a first data set 301 representing particles trapped, i.e., particles provided from the secondary outlet of the device, decreases as the size of the particles increases. Particles passed thought the main outlet, which is represented by a second data set 302, decreases to zero after a certain particle size. The distribution of injected particle size is represented by a third data set 303. A calculated efficiency for each particle size, which is represented by a fourth data set 304, exhibits a sharp increase over a relatively narrow particle size range, which result is desirable but quite unexpected. A maximum pressure drop of about 1.9 kPa, which is relatively low, was also unexpectedly observed.

The results of the simulation were also analyzed on a mass basis. For the inertial separator design discussed above, for a total mass of 1.19e-07 gr. provided to the device, 9.66e-08 gr. were separated from the air flow, which represents about an 81.34% efficiency. In the particle size distribution used for the simulation, the mass is concentrated at particle size ranged from 8.57e-6 m to 1.26e-4 m, which is very close to the high efficiency diameter range. Thus, for the design that was tested, <90% of particles above the diameter 2.10e-5 m will become separated from the main air flow and trapped in the secondary or separation chamber of the filter.

It will be appreciated that the foregoing description provides examples of the disclosed system and technique. However, it is contemplated that other implementations of the disclosure may differ in detail from the foregoing examples such as, for example, the particular geometry of the inertial separator, which can be adjusted based on the operating parameters of a particular application. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An air cleaner for an internal combustion engine, comprising:
    a housing forming a first chamber and a second chamber, the first and second chambers being physically separate;
    an air filter disposed within the first chamber;
    an outlet pipe extending through the housing and associated with the air filter such that air from the first chamber enters the outlet pipe through the air filter;
    an inertial separator having an inlet, a first outlet, and a second outlet, the inlet configured to draw air into the inertial separator, the first outlet disposed in fluid communication with the first chamber, and the second outlet disposed in fluid communication with the second chamber,
    wherein, during operation, debris that may enter the air cleaner entrained in an air flow through the inlet may separate from the air flow and collect in the second chamber, the air flow passing into the first chamber; and
    wherein the inertial separator comprises:
    an inlet portion that is generally straight, the inlet portion forming the inlet at one end and having a centerline;
    a Y-junction fluidly connected at a second end of the inlet portion;
    a first conduit forming the first outlet at one end and being fluidly connected to the inlet portion at the Y-junction;
    a second conduit forming the second outlet at one end and being fluidly connected to the inlet portion at the Y-junction;
    wherein an angle is formed between a major longitudinal dimension of the separator wall and the inlet portion centerline; and
    wherein a ramp is formed adjacent the second end of the generally straight inlet portion, upstream of the Y-junction in a direction of airflow from the inlet opening towards the first and second outlets.

2. The air cleaner of claim 1, further comprising a separator wall disposed between and along at least a portion of the first and second conduits, the separator wall having a tip extending into the Y-junction between an inlet to the first conduit and an inlet to the second conduit.

3. The air cleaner of claim 1, wherein the angle is between 100 and 120 degrees.

4. The air cleaner of claim 1, wherein the ramp is formed as a reduced diameter portion of the inlet portion, the reduced diameter portion extends into an interior of the inlet portion on one diametrical side thereof but not an opposite diametrical side.

5. The air cleaner of claim 1, wherein the tip is curled towards the second conduit and away from the first conduit such that a vortex swirl on a downstream side of the tip is reduced during operation.

6. The air cleaner of claim 1, further comprising an increased diameter section in the second conduit adjacent the Y-junction and the tip.

7. The air cleaner of claim 1, wherein the inlet portion is formed as a circular cross-section tube having a diameter and a length, and wherein the length is at least three times the diameter.

8. The air cleaner of claim 1, wherein a scavenge air conduit is fluidly connected to the second chamber and configured to draw air and/or debris from therewithin during operation of the air cleaner.

9. An engine comprising an air inlet conduit fluidly connected to an intake collector and an exhaust pipe fluidly connected to an exhaust collector, the engine further comprising:
   an air cleaner having a housing forming a first chamber and a second chamber;
   an air filter disposed within the first chamber;
   an outlet pipe extending through the housing and associated with the air filter such that air from the first chamber enters the outlet pipe through the air filter, the outlet pipe being fluidly connected to the inlet conduit of the engine;
   an inertial separator having an inlet, a first outlet, and a second outlet, the inlet configured to draw air into the inertial separator, the first outlet disposed in fluid communication with the first chamber, and the second outlet disposed in fluid communication with the second chamber,
   wherein, during operation, debris that may enter the air cleaner entrained in an air flow through the inlet may separate from the air flow and collect in the second chamber, the air flow passing into the first chamber; and
   a venturi device associated with the exhaust pipe and operating to draw air from a scavenge air conduit fluidly connected to the second chamber;
   wherein the inertial separator comprises:
   an inlet portion that is generally straight, the inlet portion forming the inlet at one end and having a centerline;
   a Y-junction fluidly connected at a second end of the inlet portion;
   a first conduit forming the first outlet at one end and being fluidly connected to the inlet portion at the Y-junction;
   a second conduit forming the second outlet at one end and being fluidly connected to the inlet portion at the Y-junction;
   wherein an angle is formed between a major longitudinal dimension of the separator wall and the inlet portion centerline; and
   wherein a ramp is formed adjacent the second end of the generally straight inlet portion, upstream of the Y-junction in a direction of airflow from the inlet opening towards the first and second outlets.

10. The engine of claim 9, further comprising a separator wall disposed between and along at least a portion of the first and second conduits, the separator wall having a tip extending into the Y-junction between an inlet to the first conduit and an inlet to the second conduit, wherein the tip is curled towards the second conduit and away from the first conduit such that a vortex swirl on a downstream side of the tip is reduced during operation.

11. The engine of claim 9, wherein the angle is between 100 and 120 degrees.

\* \* \* \* \*